United States Patent
Starostin et al.

(10) Patent No.: US 11,216,700 B2
(45) Date of Patent: Jan. 4, 2022

(54) AUTOMATED MATERIAL CLASSIFICATION BY STRUCTURAL FEATURES

(71) Applicant: Schlumberger Technology Corporation, Sugar Land, TX (US)

(72) Inventors: Alexander Starostin, Abingdon (GB); Alexander Nadeev, Spring, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/404,724

(22) Filed: May 6, 2019

(65) Prior Publication Data
US 2020/0356822 A1 Nov. 12, 2020

(51) Int. Cl.
*G06T 7/00* (2017.01)
*G06K 9/62* (2006.01)
*G06N 3/08* (2006.01)
*G06N 3/04* (2006.01)
*G06T 7/62* (2017.01)

(52) U.S. Cl.
CPC ............. *G06K 9/6268* (2013.01); *G06N 3/04* (2013.01); *G06N 3/084* (2013.01); *G06T 7/62* (2017.01); *G06T 2207/20081* (2013.01); *G06T 2207/20084* (2013.01); *G06T 2207/30181* (2013.01)

(58) Field of Classification Search
CPC ... G01N 2203/0658; G01N 2291/0232; G01N 2291/02818; G01N 2291/02827; G01N 2291/0289; G01N 24/081; G06N 20/00; G01V 1/30; G01V 1/302; G01V 1/306; G01V 1/307; G01V 1/345; G01V 2210/63; G01V 2210/64; G01V 2210/74; G01V 3/32; G01V 5/04; G01V 5/107; G01V 99/005; G01V 11/002
See application file for complete search history.

(56) References Cited

U.S. PATENT DOCUMENTS

2011/0295580 A1\* 12/2011 Sisk ........................ G01N 33/24
703/10
2013/0308831 A1\* 11/2013 Dvorkin .................. E21B 47/00
382/109

(Continued)

FOREIGN PATENT DOCUMENTS

WO 2015/099563 A1 7/2015

OTHER PUBLICATIONS

Qi, et al., 2008, "Automated quantification of colonic crypt morphology using integrated microscopy and optical coherence tomography," Journal of Biomedical Optics, 13 (5), 054055, Sep./Oct. 2008.

(Continued)

*Primary Examiner* — Quan M Hua
(74) *Attorney, Agent, or Firm* — Colin L. Wier

(57) ABSTRACT

A method, apparatus, and program product perform microstructure analysis of a digital image of rock using a trained convolutional neural network model to generate a plurality of rock features. The rock features can represent a pore space in the microstructure of the rock including pores and throats. In many implementations, a statistical process can be applied to the rock features to generate characteristics of the pore space which can be used in classifying the rock.

16 Claims, 7 Drawing Sheets

(56) References Cited

U.S. PATENT DOCUMENTS

2015/0206315 A1* 7/2015 Price .................. G06T 7/162
                                                    382/180
2016/0328419 A1* 11/2016 Safonov ............... E21B 49/02
2020/0225177 A1* 7/2020 Sungkorn ............ G01N 24/081

OTHER PUBLICATIONS

Thewlis, "Classification and quantification of microstructures in steels," 2013, Material Science and Technology, vol. 20, pp. 143-160, Jul. 19, 2013.

* cited by examiner

AUTOMATED MATERIAL CLASSIFICATION BY STRUCTURAL FEATURES

BACKGROUND

Simulation and modeling software are used throughout the oil & gas industry for exploration, appraisal, development and production of oil fields. In addition, visualization tools incorporated into or external to such software are used to display and manipulate representations of petroleum reservoirs that are modelled as large volumes subdivided into cells, with each cell storing properties of the reservoir in particular locations in the reservoir.

Some of the properties that are utilized in many reservoir models and simulations are porosity and permeability. Porosity refers generally to the fraction of spaces or voids in a material (e.g., a rock), and thus is useful for estimating the volume of fluid (e.g., hydrocarbons) that can be contained within the material. Permeability refers generally to the ability of a material such as a rock to transmit fluids. For some types of rocks, e.g., sedimentary rocks, the rocks are primarily formed of tiny grains that are separated from one another by a pore space generally formed of pores connected by throats, and the relative sizes and geometries of such pore spaces can appreciably affect the volume of hydrocarbons contained in different regions of a reservoir as well as the ability of such hydrocarbons to be recovered by a reservoir production system.

Therefore, a significant need exists in the art for an improved manner of assessing rock properties, and particularly for doing so in a computationally efficient manner.

SUMMARY

The implementations disclosed herein provide a method, apparatus, and program product that receive a digital image of a microstructure of a rock, process the digital image using a trained computer-implemented machine learning model to generate a plurality of rock features for the rock, where the generated plurality of rock features identify a pore space in the microstructure of the rock that includes one or more pores and one or more throats, apply a statistical process to the generated plurality of rock features to generate a plurality of characteristics of the pore space, process the generated plurality of characteristics of the pore space to generate a classification of the rock, and cause a computing system to render output based on the classification of the rock.

In some implementations, the trained machine learning model is a trained convolutional neural network model.

In some implementations, the trained convolutional neural network model is generated by identifying a plurality of training instances, where each training instance includes a first digital rock training image and a second digital rock training image, where the first digital rock training image captures a portion of a training rock where the training rock includes a training rock microstructure, and where the second digital rock training image captures the same portion of the training rock and identifies a training pore space within the training rock microstructure. Some implementations also include processing the first digital rock training image as training input using the convolutional neural network model to generate predicted pore space output of the convolutional neural network model. Some implementations also include updating one or more weights in the convolutional neural network model by determining a difference between the predicted pore space output and the training pore space of the second digital rock training image.

In some implementations, applying the statistical process includes determining a surface area for each pore in the pore space, and determining a surface area for each throat in the pore space. In some implementations, applying the statistical process includes determining a pore connectivity index, wherein the pore connectivity index is a function of the surface area for each pore and the surface area for each throat.

In some implementations, receiving the digital image further includes receiving a horizontal image that captures a horizontal portion of the rock, and receiving a vertical image that captures a vertical portion of the rock, and wherein the vertical image is substantially perpendicular to the horizontal image. In some implementations, processing the digital image using the trained machine learning model further includes processing the horizontal image using the trained machine learning model to generate a plurality of horizontal rock features, wherein the plurality of horizontal rock features identify a horizontal pore space in the microstructure of the rock, processing the vertical image using the trained machine learning model to generate a plurality of vertical rock features, wherein the plurality of vertical rock features identify a vertical pore space in the microstructure of the rock, and determining a heterogeneity rock measure using the generated horizontal rock features and the generated vertical rock features.

In some implementations, the rock is a sedimentary rock and wherein the pore space separating the plurality of mineral particles is capable of containing hydrocarbons.

In some implementations, the digital image is among a plurality of digital images of the microstructure of the rock captured at a plurality of scales. Some implementations further include processing the plurality of digital images using the trained computer-implemented machine learning model executed by the one or more processors such that the generated plurality of rock features are generated at least in part from digital images captured at the plurality of scales. In some implementations, the plurality of digital images include two or more of an x-ray computerized tomography (CT) image, a micro-CT image, a nano-CT image, a confocal microscopy image, and an Focused Ion Beam Scanning Electron Microscope (FIB-SEM) image.

Some implementations may also include an apparatus including at least one processing unit and program code configured upon execution by the at least one processing unit to perform any of the above-descried operations. Some implementations may also include a program product including a computer readable medium and program code stored on the computer readable medium and configured upon execution by at least one processing unit to perform any of the above-described operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example implementations of the invention. This summary is merely provided to introduce a selection of concepts that are further described below in the detailed description, and is not intended to identify key or essential features of the claimed subject

DETAILED DESCRIPTION

Figure 1:
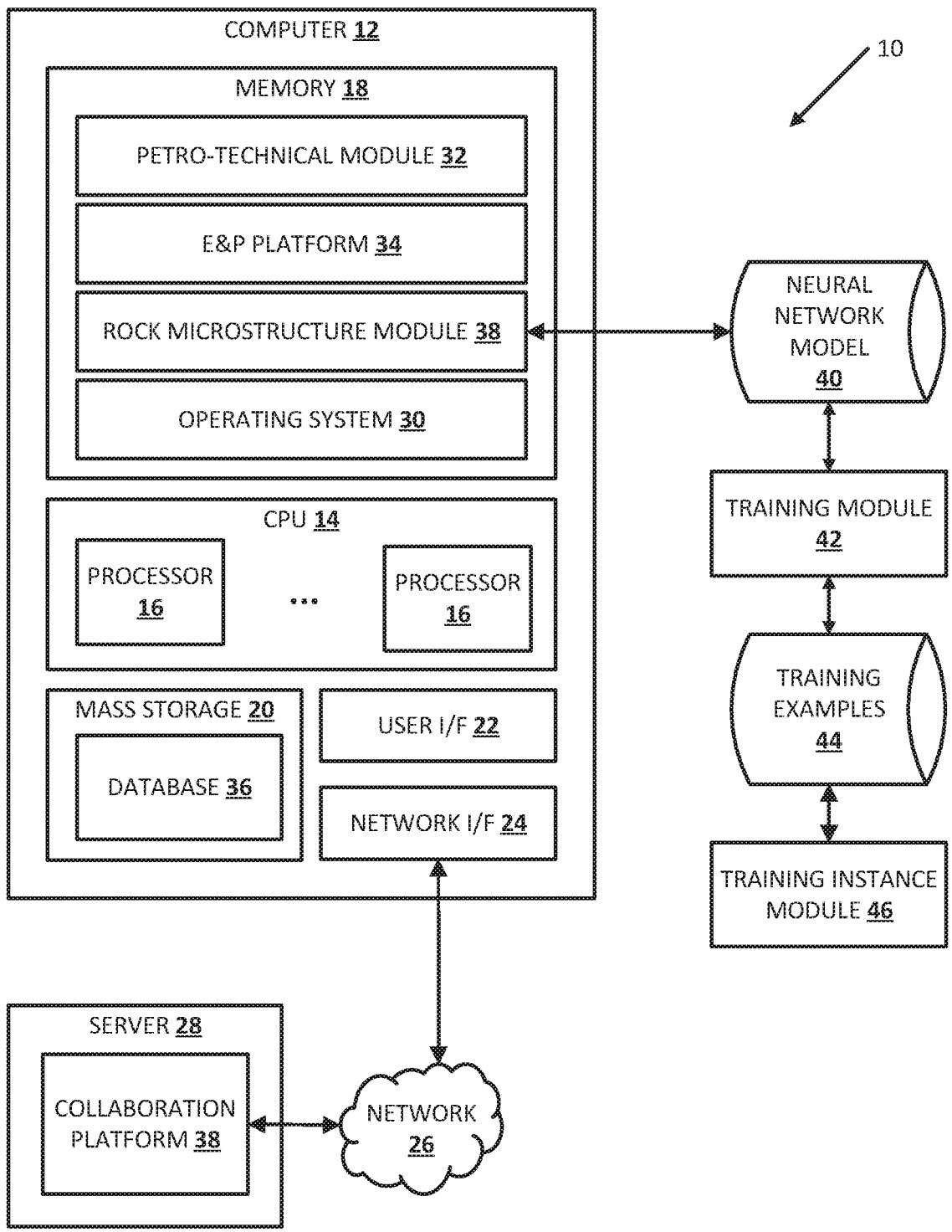
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting implementation, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In many implementations, computer 12 includes rock microstructure module 38 which can be utilized in analyzing the microstructure of a rock by processing a digital image of a rock microstructure using a neural network model 40. Additionally or alternatively, rock microstructure module 38, using training module 42, can train neural network model 40 using training examples 44. In many implementations, training examples 44 can be generated using training instance module 46.

In general, the routines executed to implement the implementations disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while implementations have and hereinafter will be described in the context of fully functioning computers and computer systems, those skilled in the art will appreciate that the various implementations are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific implementation of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
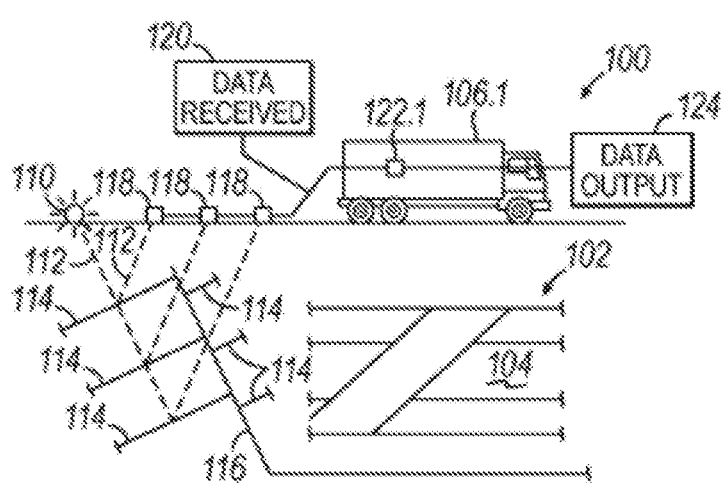
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
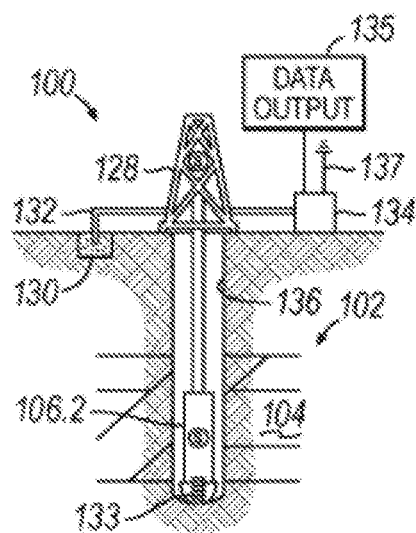

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
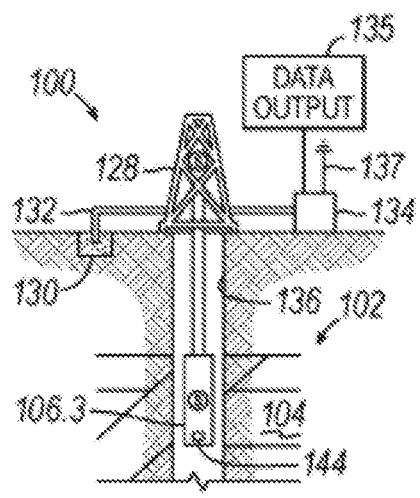

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
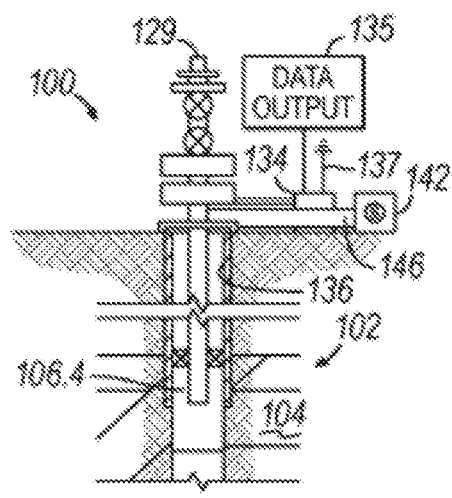

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
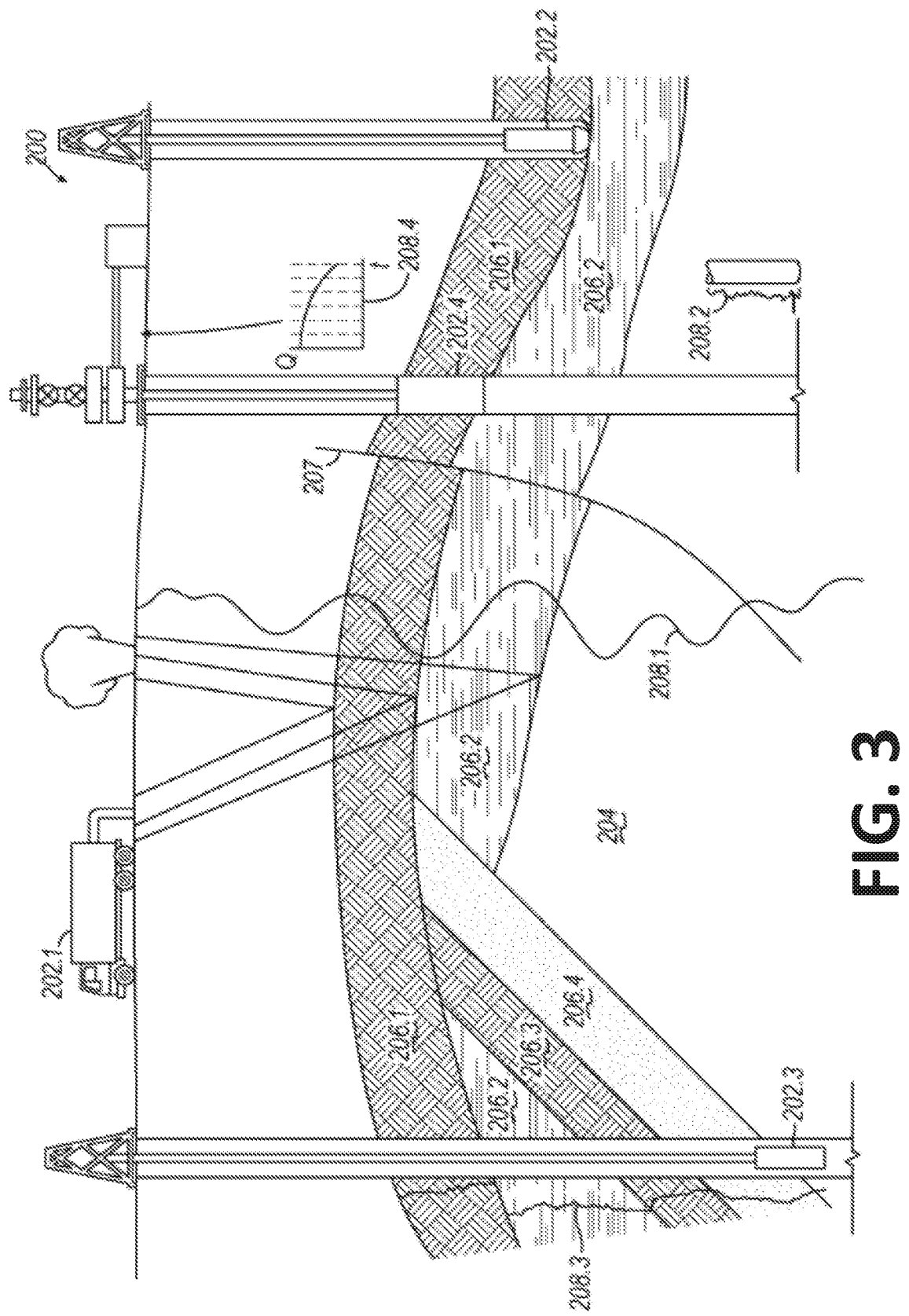
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
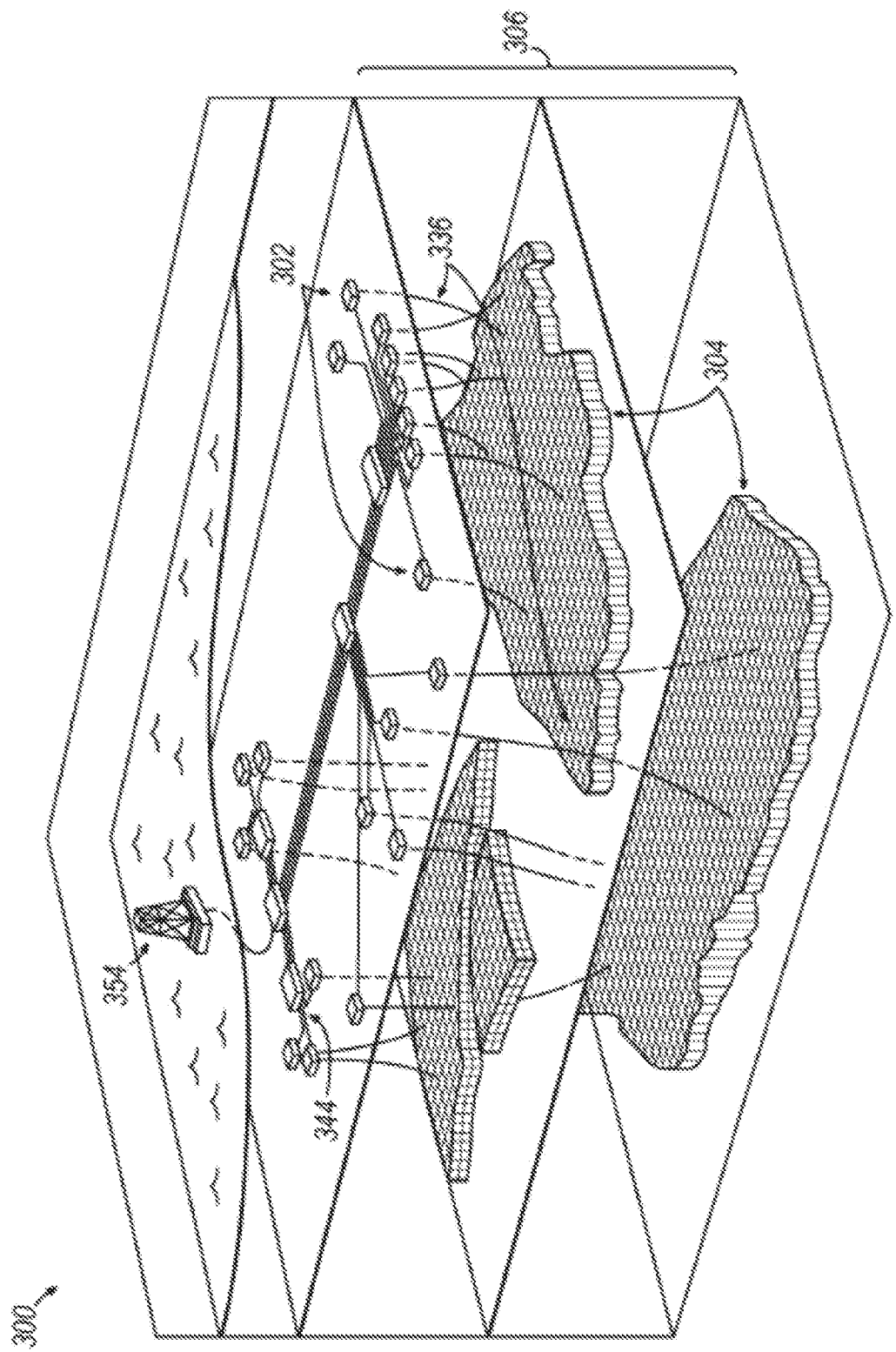
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Microstructure Analysis of Rocks Using Structural Features

Figure 7B:
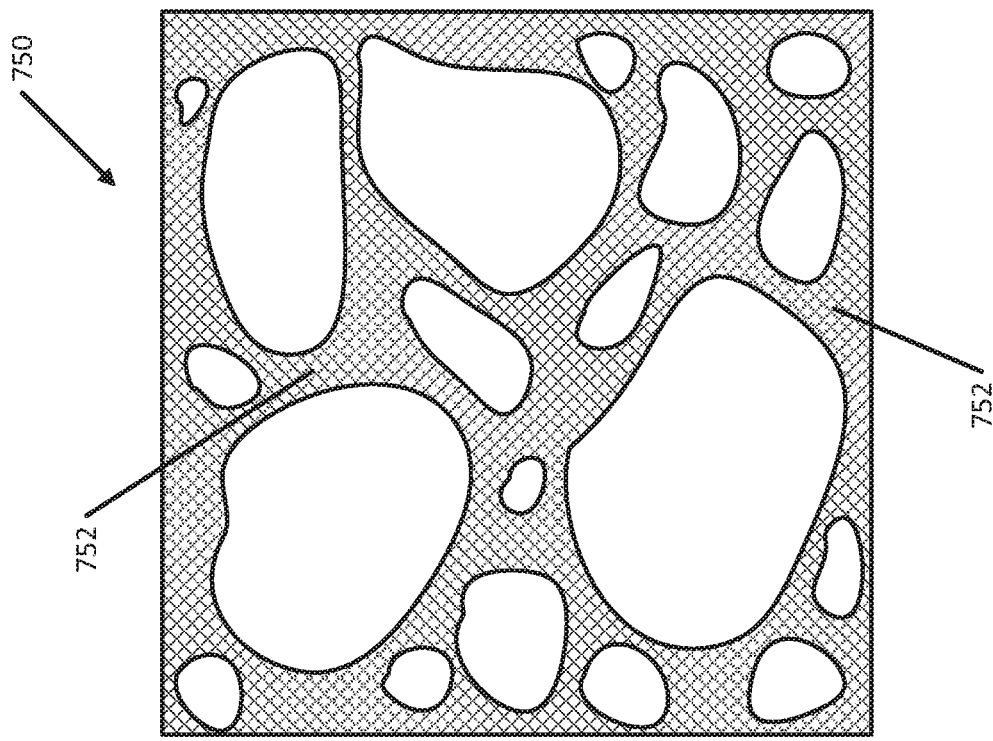
FIG. 7A-7B are example images of a microstructure of a rock.
Figure 7A:
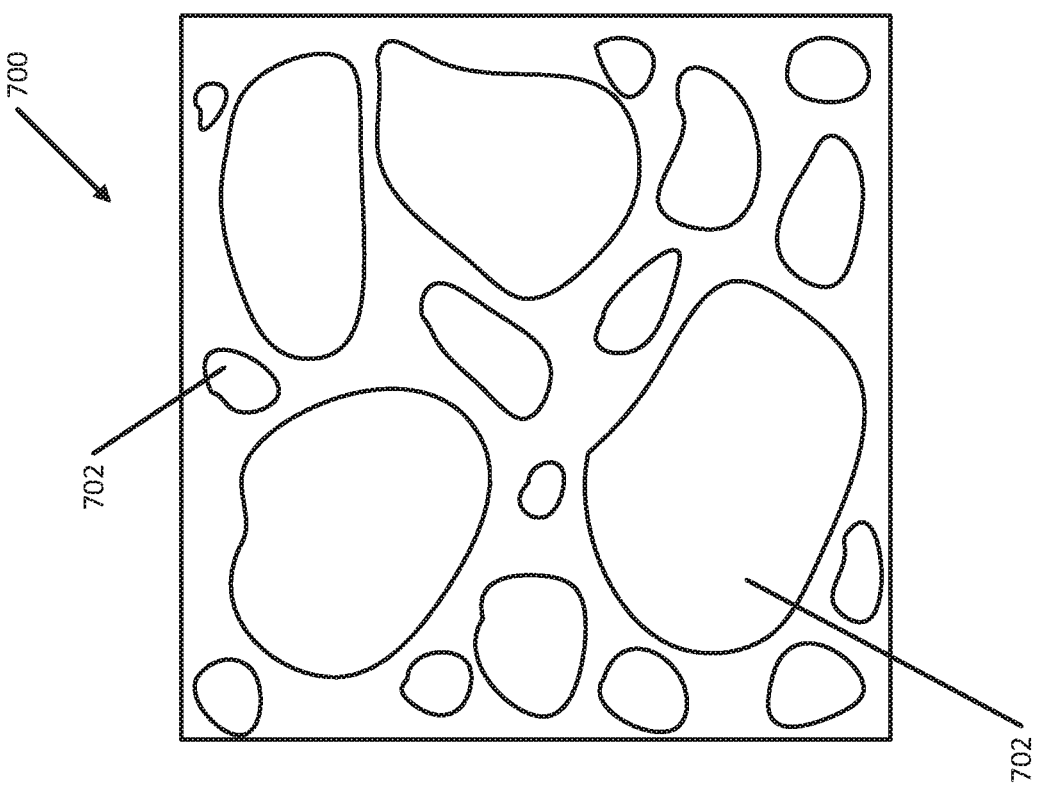

The microstructure of rocks may be comprised of many mineral grains, separated by a pore space. As illustrated in FIG. 7A, an image 700 of a microstructure of a rock includes many mineral grains 702, separated by pore space. FIG. 7B illustrates image 750 of the microstructure of the same rock sample with a shaded pore space 752. Mineral grains can be a variety of shapes and/or sizes. For example, different types of rocks can be made of different types of mineral grains, different sized mineral grains, and/or different shaped mineral grains. In many implementations, the space between mineral grains (i.e., the pore space) can include a combination of different shaped voids such as pore(s) and throat(s). Pores are discrete voids within a rock which can contain air, other gasses, hydrocarbons, and/or other fluids. Pores are generally larger than throats, which are narrower voids typically connecting two larger pores. For example, a pore space of a rock may contain petroleum. Porosity is a measure of the pore space (i.e., voids including pores and throats) within a rock. Effective porosity is the interconnected pore volume in a rock that contributes to fluid flow. In contrast, total porosity is the total void space in the rock whether or not it contributes to fluid flow. In other words, not all of the voids within a pore space are connected such that fluid can flow through them. Generally effective porosity of a rock is less than the total porosity.

Digital images capturing the microstructure of a rock may be processed in accordance with many implementations to classify the rock. For example, digital images may include x-ray computerized tomography (CT) images, micro-CT images, nano-CT images, confocal microscopy images, Focused Ion Beam Scanning Electron Microscope (FIB-SEM) images, and/or additional types of digital images.

Figure 6:
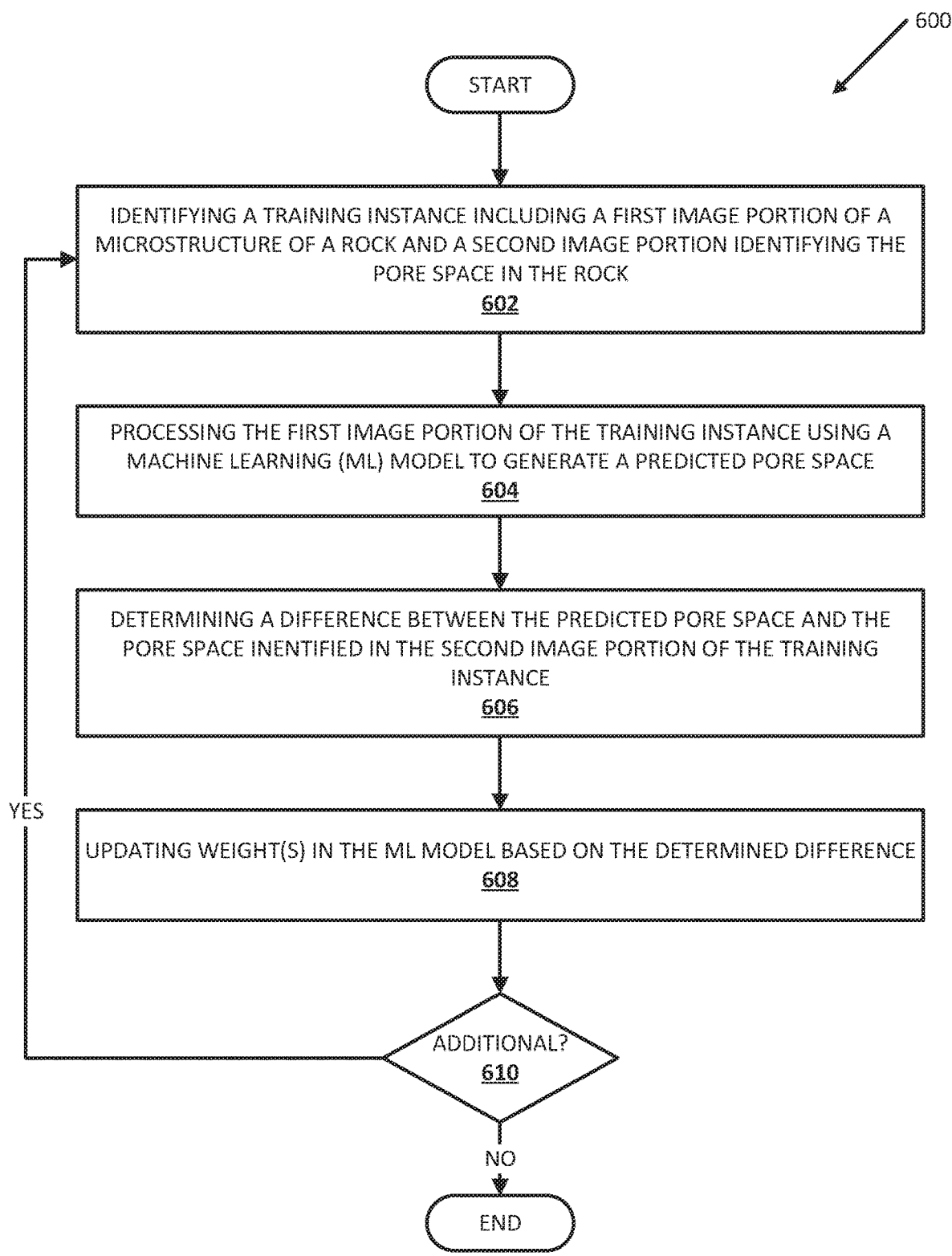
FIG. 6 is a flowchart illustrating an example implementation of training the neural network model referenced in FIG. 5.

The pore space of a rock may be determined by processing a digital image of the microstructure of a rock using a machine learning model in accordance with many implementations. For example, the machine learning model may be a neural network model such as a convolutional neural network model. Convolutional neural network models typically include an input layer, an output layer, as well as multiple hidden layers. Hidden layers may include a variety of neural network layers including convolutional layers, pooling layers, fully connected layers, and/or additional layers. In a variety of implementations, convolutional layers may be trained (by updating one or more weights in the layer) to extract features from a given input image. Pooling layers may be local or global, and combine the output generated by a cluster of neurons in a layer into a single neuron in the next layer. For example, max pooling may use the maximum value from each cluster of neurons at the prior layer. Additionally or alternatively, average pooling may use the average value from each of a cluster of neurons at the prior layer. FIG. 6 below describes a process of training a machine learning model in accordance with many implementations.

Figure 5:
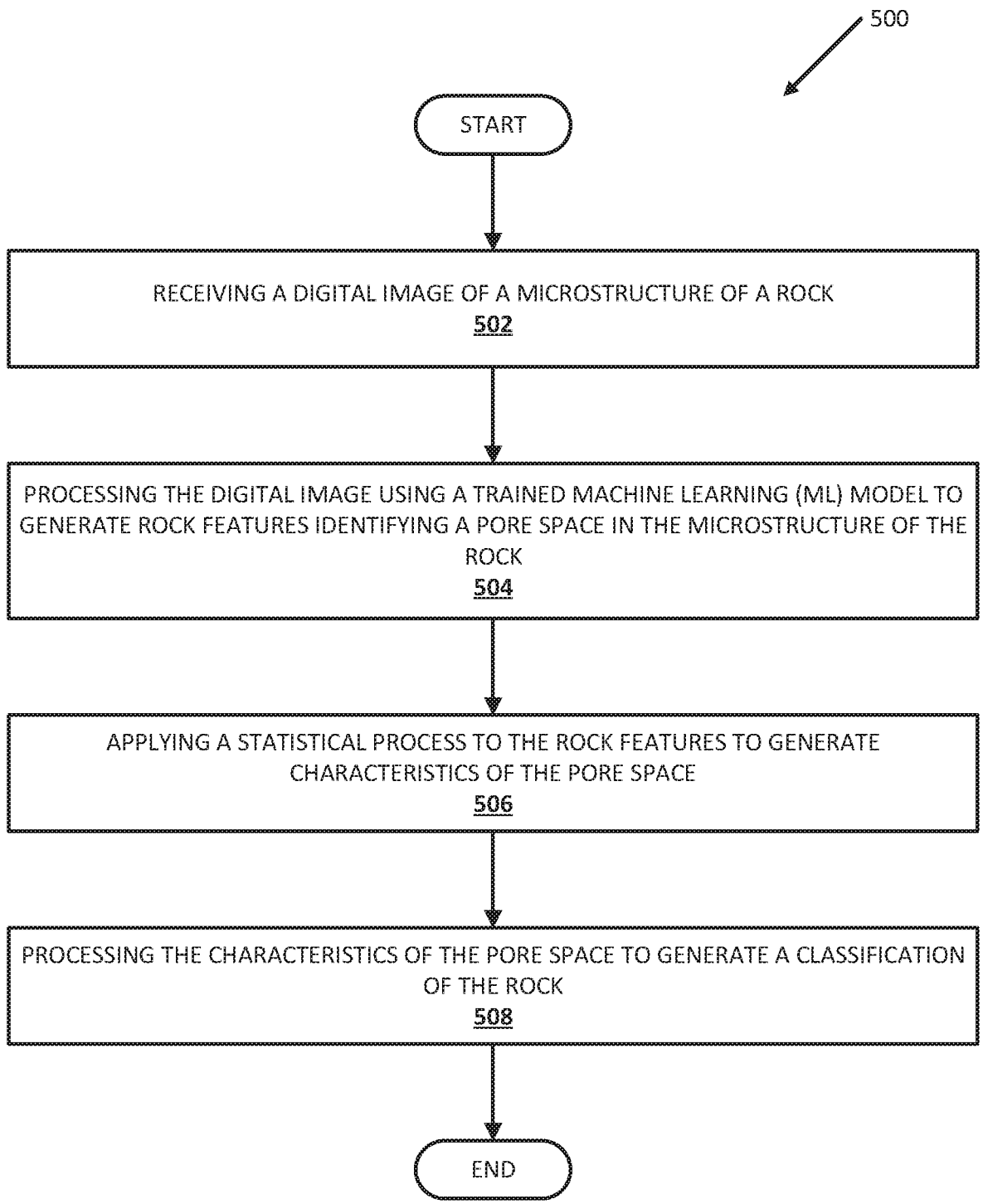
FIG. 5 is a flowchart illustrating an example sequence of operations for generating a classification using the data processing system of FIG. 1.

As shown in FIG. 5, for example, an example process 500 is illustrated suitable for implementation in computer 12 to generate and display a classification of a rock based on an input digital image of a microstructure of the rock. Process 500 may begin at block 502 by receiving a digital image of a microstructure of a rock. In a variety of implementations, a digital image may include a variety of images such as x-ray computerized tomography (CT) images, micro-CT images, nano-CT images, confocal microscopy images, Focused Ion Beam Scanning Electron Microscope (FIB-SEM) images, and/or additional types of digital images. Digital images may optionally be preprocessed before proceeding to block 504. For example, the digital image may be filtered and/or transformed by applying a filter and/or transformation to the digital image including one or more of a lowpass filter, a highpass filter, a Fourier transform, a reflective transformation, a scale transformation, a rotation transformation, a shearing transformation, and/or additional image processing techniques.

Next, at block 504, the digital image may be processed using a trained machine learning model to generate rock features which identify a pore space in the microstructure of the rock. Rock features may include pores and/or throats of the rock sample (i.e., the pore space). In many implementations, the trained machine learning model may be a trained convolutional neural network model. A process for training a machine learning model in accordance with many implementations of the invention is described with respect to FIG. 6.

Next, at block 506, a statistical process may be applied to the rock features generated at block 504 to generate characteristics of the pore space. For example, the statistical process may determine the surface area for each pore and/or each throat in the pore space, as well as the surface area of the entire pore space. As a further example, the statistical process may determine a pore connectivity index as a function of the surface area of each pore and/or the surface area of each throat. As yet a further example, two-dimensional (2D) digital images may be captured of the same rock sample in different directions, such as a horizontal image capturing a horizontal portion of the rock as well as a vertical image capturing a vertical portion of the rock (where the horizontal portion is substantially perpendicular to the vertical image). Additionally or alternatively, the horizontal image may be processed using the trained machine learning model to generate horizontal rock features, while the vertical image may be processed using the trained machine learning model to generate vertical rock features. Furthermore, the horizontal rock features and the vertical rock features may be used to determine the heterogeneity of the rock (i.e., the similarity of different portions of the microstructure of the rock). As yet a further example, several digital images of the microstructure of the rock may be captured at several scales (e.g., captured an overlapping portion of the rock using the same camera at different scales, capturing an overlapping portion of the rock using different cameras which inherently generate different scaled images, etc.). In some such implementations, two (or more) digital images captured at different scales may be processed by a trained neural network model to generate two (or more) sets of rock features, and a statistical process may be applied to the two (or more) sets of rock features to generate rock characteristics.

Next, at block 508, the characteristics of the pore space generated in block 506 may be processed to generate a classification of the rock. In some implementations, characteristic(s) of the pore space determined at block 506 may be used to classify a digital image of a rock. For example, different types of rocks may be classified based on their pore connectivity index value.

In some implementations, the output based on the classification of the rock generated at block 508 may be rendered via a computing device. For example, the classification of the rock may be rendered using a display of computer 12. Additionally or alternatively, a digital image highlighting the rock features identified as block 504 may be rendered via the computing device.

Now turning to FIG. 6, an example process 600 of training a machine learning model in accordance with implementations of the invention is illustrated. Process 600 may begin at block 602 by identifying a training instance including a first digital image portion of a microstructure of a rock and a second digital image portion identifying the pore space of the microstructure of the rock. In many implementations, the first digital image portion and the second digital image portion of the training instance capture the same portion of rock microstructure.

Next, at block 604, the first image portion of the training instance may be processed using a machine learning model to generate a predicted pore space. In many implementations, the machine learning model may be a convolutional neural network model.

Next, at block 606, a difference between the predicted pore space and the pore space identified in the second image portion of the training instance may be identified.

Next, at block 608, one or more weights in the machine learning model may be updated based on the difference determined at block 606. For example, the difference between the predicted pore space and the pore space identified in the second image portion of the training instance may be backpropagated over the neural network model to update one or more weights of the neural network model.

Next, at block 610, a determination may be made if the machine learning model should be trained with any additional training instance(s). If so, an additional training instance may be identified at block 602. In some implementations, at block 610 a determination may be made to not process any additional training instances if one or more training criteria has been satisfied (e.g., a threshold number of epochs have occurred, a threshold duration of training has occurred, and/or all training instances have been processed). Although process 600 is described with respect to a non-batch learning technique, batch learning may be additionally and/or alternatively utilized. A machine learning model trained according to process 600 may thereafter be reused to predict, for future digital images, a rock classification for the trained classification task.

Although the preceding description has been described herein with reference to particular means, materials, and implementations, it is not intended to be limited to the particular disclosed herein. By way of further example, implementations may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, implementations extend to all functionally equivalent structures, methods, uses, program products, and compositions as are within the scope of the appended claims. In addition, while particular implementations have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of performing microstructural analysis of a rock implemented by one or more processors, the method comprising:
   receiving a digital image of a microstructure of the rock, wherein receiving the digital image comprises,
   receiving a horizontal image that captures a horizontal portion of the rock and receiving a vertical image that captures a vertical portion of the work, wherein the vertical image is substantially perpendicular to the horizontal image;
   processing the digital image using a trained computer-implemented machine learning model executed by the one or more processors to generate a plurality of rock features for the rock, wherein the generated plurality of rock features identify a pore space in the microstructure of the rock that includes one or more pores and one or more throats, and wherein the generated plurality of rock features include one or more pore features representing the one or more pores and one or more throat features representing the one or more throats, wherein processing the digital image using the trained machine learning model comprises,
  processing the horizontal image using the trained machine learning model to generate a plurality of horizontal rock features, wherein the plurality of horizontal rock features identify a horizontal pore space in the microstructure of the rock,
  processing the vertical image using the trained machine learning model to generate a plurality of vertical rock features, wherein the plurality of vertical rock features identify a vertical pore space in the microstructure of the rock, and
  determining a heterogeneity rock measure using the generated horizontal rock features and the generated vertical rock features;
applying a statistical process to the generated plurality of rock features using the one or more processors to generate a plurality of characteristics of the pore space;
processing the generated plurality of characteristics of the pore space using the one or more processors to generate a classification of the rock; and
causing a computing system to render output based on the classification of the rock.

2. The method of claim 1, wherein the trained machine learning model is a trained convolutional neural network model.

3. The method of claim 2, further comprising:
generating the trained convolutional neural network model by:
  identifying a plurality of training instances, wherein each training instance includes a first digital rock training image and a second digital rock training image, wherein the first digital rock training image captures a portion of a training rock where the training rock includes a training rock microstructure, and wherein the second digital rock training image captures the same portion of the training rock and identifies a training pore space within the training rock microstructure;
  processing the first digital rock training image as training input using the convolutional neural network model to generate predicted pore space output of the convolutional neural network model; and
  updating one or more weights in the convolutional neural network model by determining a difference between the predicted pore space output and the training pore space of the second digital rock training image.

4. The method of claim 1, wherein applying the statistical process comprises:
determining an area for each pore in the pore space; and
determining an area for each throat in the pore space.

5. The method of claim 4, wherein applying the statistical process comprises:
determining a pore connectivity index, wherein the pore connectivity index is a function of the area for each pore and the area for each throat.

6. The method of claim 1, wherein the rock is a sedimentary rock and wherein the pore space separating the plurality of mineral particles is capable of containing hydrocarbons.

7. The method of claim 1, wherein the digital image is among a plurality of digital images of the microstructure of the rock captured at a plurality of scales, the method further comprising processing the plurality of digital images using the trained computer-implemented machine learning model executed by the one or more processors such that the generated plurality of rock features are generated at least in part from digital images captured at the plurality of scales.

8. The method of claim 7, wherein the plurality of digital images include two or more of an x-ray computerized tomography (CT) image, a micro-CT image, a nano-CT image, a confocal microscopy image, and an Focused Ion Beam Scanning Electron Microscope (FIB-SEM) image.

9. An apparatus, comprising:
at least one processing unit, and
program code configured upon execution by the at least one processing unit to:
  receive a digital image of a microstructure of a rock, wherein receiving the digital image comprises receiving a horizontal image that captures a horizontal portion of the rock and receiving a vertical image that captures a vertical portion of the work, wherein the vertical image is substantially perpendicular to the horizontal image;
process the digital image using a trained computer-implemented machine learning model to generate a plurality of rock features for the rock, wherein the generated plurality of rock features identify a pore space in the microstructure of the rock that includes one or more pores and one or more throats, and wherein the generated plurality of rock features include one or more pore features representing the one or more pores and one or more throat features representing the one or more throats, wherein processing the digital image using the trained machine learning model comprises,
  processing the horizontal image using the trained machine learning model to generate a plurality of horizontal rock features, wherein the plurality of horizontal rock features identify a horizontal pore space in the microstructure of the rock,
  processing the vertical image using the trained machine learning model to generate a plurality of vertical rock features, wherein the plurality of vertical rock features identify a vertical pore space in the microstructure of the rock, and
  determining a heterogeneity rock measure using the generated horizontal rock features and the generated vertical rock features;
apply a statistical process to the generated plurality of rock features to generate a plurality of characteristics of the pore space;
process the generated plurality of characteristics of the pore space to generate a classification of the rock; and
cause output to be rendered based on the classification of the rock.

10. The apparatus of claim 9, wherein the trained machine learning model is a trained convolutional neural network model.

11. The apparatus of claim 10, wherein the program code is further configured to:
generate the trained convolutional neural network model by:
  identifying a plurality of training instances, wherein each training instance includes a first digital rock training image and a second digital rock training image, wherein the first digital rock training image captures a portion of a training rock where the training rock includes a training rock microstructure, and wherein the second digital rock training image captures the same portion of the training rock and identifies a training pore space within the training rock microstructure;

processing the first digital rock training image as training input using the convolutional neural network model to generate predicted pore space output of the convolutional neural network model; and updating one or more weights in the convolutional neural network model by determining a difference between the predicted pore space output and the training pore space of the second digital rock training image.

12. The apparatus of claim 9, wherein the program code is configured to apply the statistical process by:

determining an area for each pore in the pore space; and
determining an area for each throat in the pore space.

13. The apparatus of claim 12, wherein the program code is configured to apply the statistical process by:

determining a pore connectivity index, wherein the pore connectivity index is a function of the area for each pore and the area for each throat.

14. The apparatus of claim 9, wherein the rock is a sedimentary rock and wherein the pore space separating the plurality of mineral particles is capable of containing hydrocarbons.

15. The apparatus of claim 9, wherein the digital image is among a plurality of digital images of the microstructure of the rock captured at a plurality of scales, and wherein the program code is further configured to:

process the plurality of digital images using the trained computer-implemented machine learning model such that the generated plurality of rock features are generated at least in part from digital images captured at the plurality of scales.

16. A program product, comprising:

a non-transitory computer-readable medium; and
program code stored on the computer-readable medium and configured upon execution by at least one processing unit to:

receive a digital image of a microstructure of a rock, wherein receiving the digital image comprises receiving a horizontal image that captures a horizontal portion of the rock and receiving a vertical image that captures a vertical portion of the work, wherein the vertical image is substantially perpendicular to the horizontal image;

process the digital image using a trained computer-implemented machine learning model to generate a plurality of rock features for the rock, wherein the generated plurality of rock features identify a pore space in the microstructure of the rock that includes one or more pores and one or more throats, and wherein the generated plurality of rock features include one or more pore features representing the one or more pores and one or more throat features representing the one or more throats, wherein processing the digital image using the trained machine learning model comprises, processing the horizontal image using the trained machine learning model to generate a plurality of horizontal rock features, wherein the plurality of horizontal rock features identify a horizontal pore space in the microstructure of the rock, processing the vertical image using the trained machine learning model to generate a plurality of vertical rock features, wherein the plurality of vertical rock features identify a vertical pore space in the microstructure of the rock, and determining a heterogeneity rock measure using the generated horizontal rock features and the generated vertical rock features;

apply a statistical process to the generated plurality of rock features to generate a plurality of characteristics of the pore space;

process the generated plurality of characteristics of the pore space to generate a classification of the rock; and cause output to be rendered based on the classification of the rock.

* * * * *